(12) United States Patent
Anderson et al.

(10) Patent No.: US 7,501,180 B2
(45) Date of Patent: Mar. 10, 2009

(54) NANOPARTICLES CONFINED IN POLYELECTROLYTES

(75) Inventors: Darren Anderson, Toronto (CA); Jane B. Goh, Toronto (CA); Jose Amado Dinglasan, Toronto (CA)

(73) Assignee: Northern Nanotechnologies, Toronto, Ontario (CA)

( * ) Notice: Subject to any disclaimer, the term of this patent is extended or adjusted under 35 U.S.C. 154(b) by 0 days.

(21) Appl. No.: 12/116,873

(22) Filed: May 7, 2008

(65) Prior Publication Data

US 2008/0199700 A1    Aug. 21, 2008

Related U.S. Application Data

(63) Continuation of application No. PCT/IB2008/00817, filed on Feb. 14, 2008, which is a continuation of application No. 12/030,359, filed on Feb. 13, 2008.

(60) Provisional application No. 60/892,927, filed on Mar. 5, 2007, provisional application No. 60/889,609, filed on Feb. 13, 2007.

(51) Int. Cl.
*B32B 5/16* (2006.01)

(52) U.S. Cl. .................. 428/403; 428/407; 977/773

(58) Field of Classification Search .................. 428/403, 428/407; 977/773
See application file for complete search history.

(56) References Cited

U.S. PATENT DOCUMENTS

| | | | |
|---|---|---|---|
| 5,433,797 A * | 7/1995 | Erb et al. | 148/304 |
| 5,807,636 A * | 9/1998 | Sheu et al. | 428/403 |
| 7,189,279 B2 | 3/2007 | Guillet et al. | |
| 7,303,819 B2 | 12/2007 | Brotzman, Jr. | |
| 2003/0124194 A1 | 7/2003 | Gaw et al. | |
| 2006/0153929 A1* | 7/2006 | Drake | 424/600 |
| 2007/0101825 A1 | 5/2007 | He | |

FOREIGN PATENT DOCUMENTS

| | | |
|---|---|---|
| WO | WO-2006076636 | 7/2006 |
| WO | WO-2007106771 | 9/2007 |

OTHER PUBLICATIONS

Laguecir et al, "Charged Polymer/Nanoparticle Mixtures: Monte Carlo Simulations", Chimia 56 (2002) 702-706.*

* cited by examiner

*Primary Examiner*—H. (Holly) T Le
(74) *Attorney, Agent, or Firm*—Choate, Hall & Stewart, LLP

(57) ABSTRACT

Methods of producing stabilized composite nanoparticles comprising a nanoparticle and a multiple polyelectrolyte stabilizing moiety layer, a method of producing a multilayer stabilized composite nanoparticle, and such nanoparticles.

13 Claims, 11 Drawing Sheets

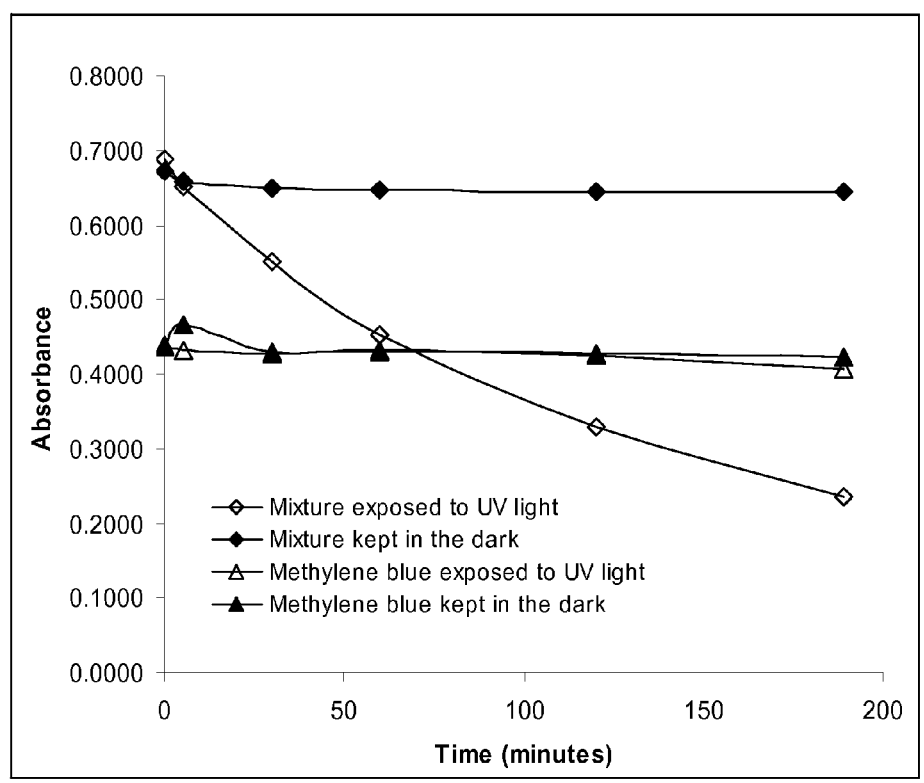
Figure 8: Graph of absorbance versus time. Open diamonds denote mixture containing ZnO and methylene blue; filled diamonds denote mixture containing ZnO and methylene blue.

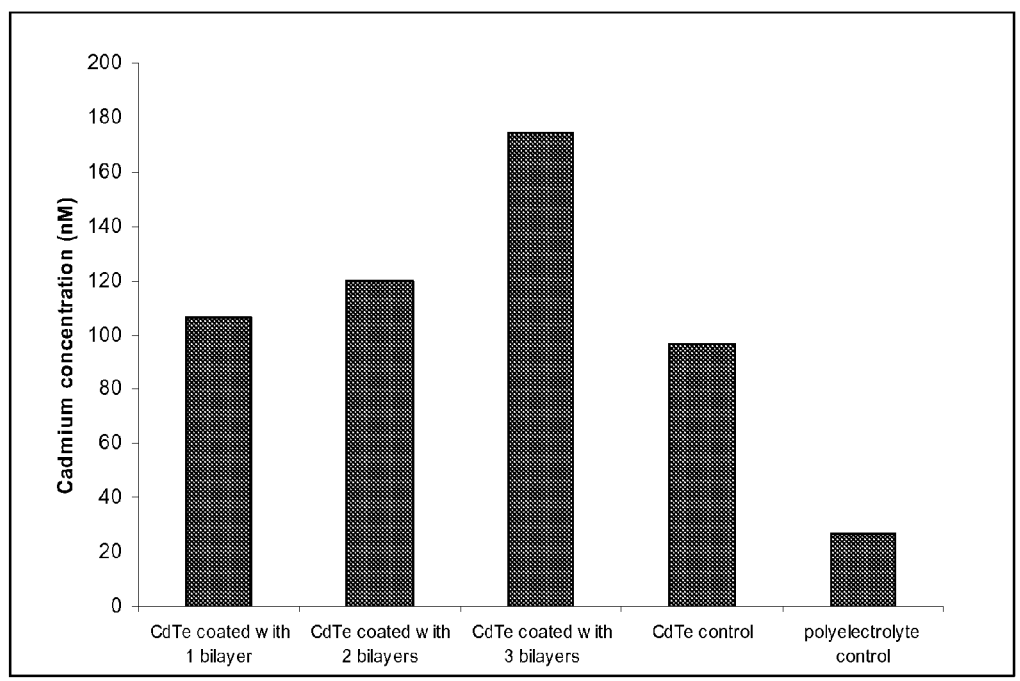
Figure 9: Measured Cd concentration in solutions prepared according to Example 5.

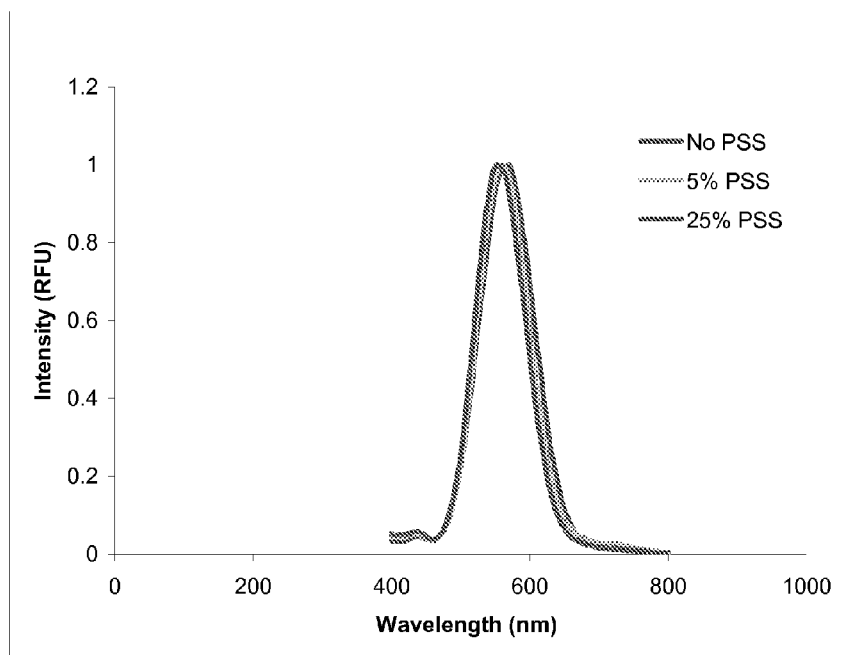
Figure 10: Emission spectra of CdTe-CdS (yellow) (excitation = 350 nm) showing the blue shift of the emission maximum from no PSS ($\lambda$max = 570nm) to 5% PSS ($\lambda$max = 560 nm) to 25% PSS ($\lambda$max = 555 nm)

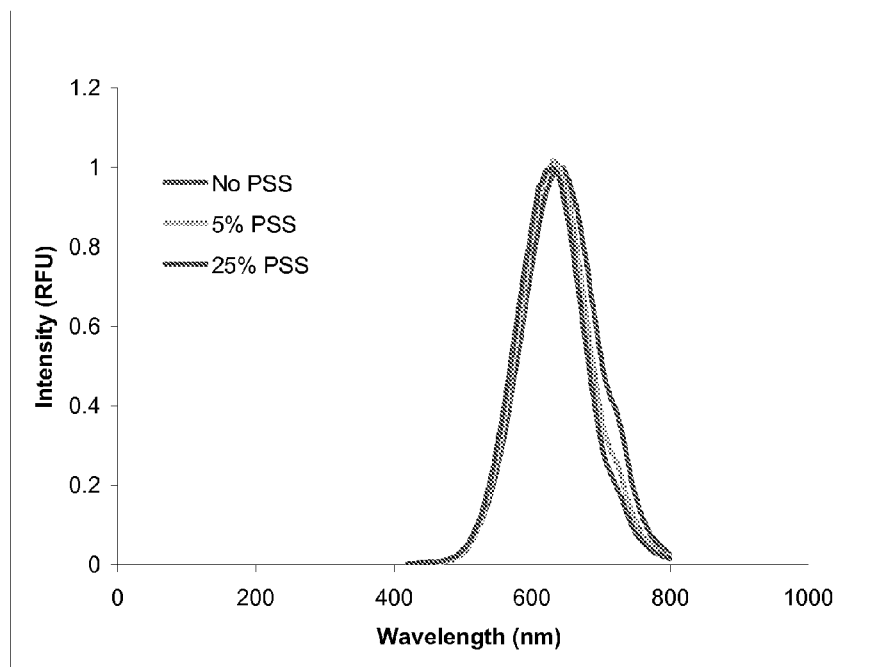
Figure 11: Emission spectra of CdTe-CdS (orange) (excitation = 408 nm) showing the blue shift of the emission maximum from no PSS ($\lambda$max = 645 nm) to 5% PSS ($\lambda$max = 640 nm) to 25% PSS ($\lambda$max = 630 nm)

NANOPARTICLES CONFINED IN POLYELECTROLYTES

This application claims the priority of U.S. Provisional Application Nos. 60/889,609 filed Feb. 13, 2007, 60/892,927 filed Mar. 5, 2007, U.S. patent application Ser. No. 12/030,359, filed Feb. 13, 2008 and PCT Application No. PCT/IB2008/00817, filed Feb. 14, 2008, the entire contents of all of which are incorporated herein by reference.

BACKGROUND OF THE INVENTION

Nanoparticles are nanometer-sized materials e.g., metals, semiconductors, polymers, and the like, that can often posses unique characteristics because of their small size. Nanoparticles are of particular interest because of their potential for use as catalysts, photocatalysts, adsorbents, sensors, and ferrofluids, as well as for their material properties in for application to optical, electronic, and magnetic devices, and formulation of plastics and other materials.

In practical application, however, the usefulness of a nanoparticle depends on more than just the properties exhibited in the laboratory. In practical application many interesting laboratory properties may not be realized due to interferents and undesired reactions with chemicals in the application environment.

SUMMARY OF THE INVENTION

In various aspects, the present inventions provide nanoparticle compositions comprising a stabilizer and methods to tailor the permeability of a stabilizer that, e.g., impart a nanoparticle composite with certain solubility and non-aggregative characteristics. For example, in various embodiments, a stabilizer can be modified to tune its permeability to materials moving from the nanoparticle surface to the surrounding environment and/or vice versa.

In various aspects, the present invention provides methods to produce nanoparticles that are stabilized, where the stabilizer provides solubility and/or prevents aggregation, and with a selected permeability to selected small chemical entities. For example, in various embodiments, the present inventions provide methods for producing a stabilized composite nanoparticle comprising the steps of: a) providing a solution comprising at least one nanoparticle and at least one stabilizing moiety dispersed therein; and, b) modifying at least one stabilizer moiety in the solution to change its permeability to SCEs.

For example, in various embodiments, the present inventions provide nanoparticle compositions that are stabilized, where the stabilizer is chosen to allow for one or more of: (a) improved permeability to certain SCEs; (b) decreased permeability to certain SCEs; and (c) improved permeability to a first group of SCEs and decreased permeability to a second group of SCEs.

In preferred embodiments of the present invention, the stabilizing moiety comprises one or more polymeric stabilizers. Examples of suitable means to modify the polymeric stabilizer to change the nanoparticle transport properties include, but are not limited to, (a) radiation or chemical-induced internal and/or external crosslinking of stabilizer moieties, where the degree of crosslinking controls the permeability of the layer; (b) change of solution conditions and/or use of heating and/or cooling to induce expansion or contraction of the polymeric stabilizer layer; (c) adsorption or desorption of additional moieties (adsorbates) to the polymer network, which can be assisted by chemical bond formation or cleavage; and (d) one or more combinations thereof. Non-limiting examples of suitable polymeric materials for use as stabilizer moieties are discussed herein, and but can be synthetic or naturally occurring and can be linear, branched, hyperbranched, and/or dendrimeric.

As used herein, the terms "stabilizing moiety" or "stabilizer" are used interchangeably and refer to a material that interacts with the nanoparticle (e.g., through covalent, non-covalent, ionic, van der Waals, etc. bonds) and which imparts desirable solubility characteristics and/or prevents aggregation of the nanoparticles.

As used herein, the terms "adsorbate" and "adsorbate moiety" are used interchangeably and refer to an entity that preferentially associates with a polymer-stabilized nanoparticle. This association can be physisorption, chemisorption, through covalent bonds, through electrostatic interactions, or through van der Waals forces and the like.

As used herein, the term, "small chemical entities" (SCEs) refers to cations, anions, or neutral species of various types that are between about 0.1 nanometers (nm) to about 5 nm in size and are soluble in the solvent in which the nanoparticles are dispersed. In various embodiments, where for example the nanoparticles are provided alone or on a solid support, SCEs refer to cations, anions, or neutral species of various types that are between 0.1 nm to about 5 nm in size and in the gaseous state.

As used herein, the terms "nanoparticle composition" when referring to a nanoparticle composition comprising one or more stabilizer moieties and "stabilized nanoparticle" are used interchangeably.

As used herein, the terms "solid support" and "support" are used interchangeably and refer to any solid phase material. Examples of solid supports include, but are not limited to, resins, membranes, gels, and micron-sized or larger particulates. A solid support can be composed of one or more organic polymers such as, e.g., polystyrene, polyethylene, polypropylene, polyfluoroethylene, polyethyleneoxy, and polyacrylamide. A solid support can be composed of one or more inorganic materials, such as, e.g., glass, silica, controlled-pore-glass, or reverse-phase silica. The solid support can be porous or non-porous, and can have swelling or non-swelling characteristics.

Suitable stabilizing moieties for the present invention include stabilizing moieties that can be internally or externally chemically modified to introduce new intramolecular and/or intermolecular chemical bonds between one or more stabilizing moieties, e.g., to crosslink one or more stabilizing moieties. Suitable stabilizing moieties also include stabilizing moieties taken alone or in combination, which have a three-dimensional structure that can be expanded or contracted using a chemical or physical change. Suitable stabilizing moieties also include stabilizing moieties taken alone or in combination that are modified to increase or decrease the thickness or density of the layer about a nanoparticle containing the stabilizing moieties.

In various embodiments, suitable stabilizing moieties include, but are not limited to, polymers, ligands, coordinating ions, coordinating complexes, or combinations thereof.

In various embodiments, the present inventions provide a stabilized nanoparticle incorporated onto or into a solid support using standard techniques such as spin coating, extrusion, codeposition, layer-by-layer assembly, or the like.

BRIEF DESCRIPTION OF THE DRAWINGS

The foregoing and other aspects, embodiments, objects, features and advantages of the present inventions can be more fully understood from the description in conjunction with the accompanying drawings. In the drawings, like reference characters generally refer to like features and structural elements throughout the various figures. The drawings are not necessarily to scale, emphasis instead being placed upon illustrating the principles of the present inventions, wherein.

Figure 1:
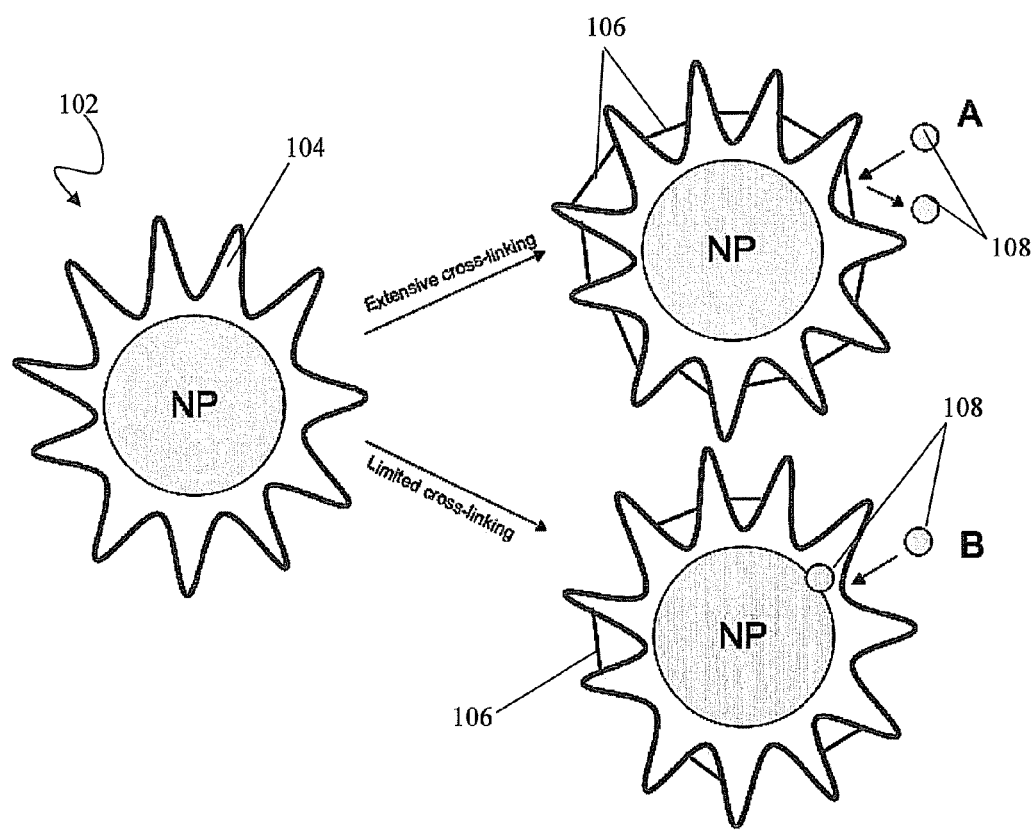
FIG. 1 schematically depicts a nanoparticle composition (102) comprising a nanoparticle (NP) and a stabilizer moiety layer (104); illustrating that increased cross-linking (106) of the stabilizing moieties (situation A) reducing permeability to a SCE (108) compared to a composition with a lesser degrees of cross-linking (situation B).

FIG. 2 schematically depicts a nanoparticle composition (202) comprising a nanoparticle (NP) and a stabilizer moiety layer (204); illustrating that less favorable interaction of the stabilizing moieties with the solvent (situation A) resulting in contraction of the stabilizer moiety layer (206) and reducing permeability to a SCE (208) compared to a composition with a more favorable interaction of the stabilizing moieties with the solvent (situation B) resulting in expansion of the stabilizer moiety layer (210) and increased permeability to a SCE.

FIG. 3 schematically depicts the modification of a nanoparticle composition (302) comprising a nanoparticle (NP) and a stabilizer moiety layer (304) by addition of an adsorbate moiety (306); illustrating modification of the stabilizing moieties with an adsorbate (situation A) reducing permeability to a SCE (308) compared to a composition without an adsorbate (situation B).

FIG. 4 schematically depicts layer-by-layer assembly of a nanoparticle composition according to various embodiments of the present inventions.

FIG. 5 depicts photoluminescence spectra of CdTe-S quantum dots of Example 2 treated with polyelectrolyte stabilizers. The dotted line is for the sample exposed to high intensity UV radiation (254 nm) while the solid line is for the sample not exposed to the UV radiation.

FIG. 6 depicts photoluminescence spectra of CdTe-S quantum dots of Example 2 not treated with stabilizers. The dotted line is for the sample exposed to high intensity UV radiation (254 nm) while the solid line is for the sample not exposed to UV radiation.

FIG. 7 depicts UV visible and emission spectra for CdS/PAA of Example 3 formed using $Cd^{2+}$/PAA that was crosslinked at different times.

FIG. 8 depicts a graph of absorbance versus time.

FIG. 9 depicts measured Cd concentration in solutions prepared according to Example 5.

FIG. 10 depicts the Emission spectra of CdTe-CdS (yellow) (excitation=350 nm) showing the blue shift of the emission maximum from no PSS (λmax=570 nm) to 5% PSS (λmax=560 nm) to 25% PSS (λmax=555 nm)

FIG. 11 depicts the mission spectra of CdTe-CdS (orange) (excitation=408 nm) showing the blue shift of the emission maximum from no PSS (λmax=645 nm) to 5% PSS (λmax=640 nm) to 25% PSS (λmax=630 nm)

DESCRIPTION OF VARIOUS EMBODIMENTS

Prior to further describing the present inventions, it may be helpful to provide a general discussion of polymers and nanoparticles.

A. General

The conformation of a polymer in solution is dictated by various conditions of the solution, including, for example, its interaction with the solvent, its concentration, and the concentration of other species that may be present. A polymer can undergo conformational changes, e.g., depending on the pH, ionic strength, cross-linking agents, temperature and concentration. For polyelectrolytes, at high charge density, e.g., when "monomer" units of the polymer are fully charged, an extended conformation is adopted due to electrostatic repulsion between similarly charged monomer units. Decreasing the charge density of the polymer, e.g., through addition of salts or a change of pH, can result in a transition of the extended polymer chains to a more tightly packed globular, i.e., collapsed conformation. Such a collapse transition is driven by attractive interactions between the polymer segments that overcome the electrostatic repulsion forces. Changing the solvent environment of a polymer can induce a similar transition. This collapsed polymer can be of nanoscale dimensions and a nanoparticle. This collapsed conformation can be rendered irreversible by the formation of intramolecular chemical bonds between segments of the collapsed polymer, e.g., by cross-linking.

As used herein, the term "collapsed polymer" refers to an approximately globular form, generally as a spheroid, but also as an elongate and/or multi-lobed conformation collapsed polymer having nanometer dimensions.

B. Nanoparticle Compositions

In various aspects, the present inventions provide nanoparticle compositions comprising a nanoparticle having a layer of one or more stabilizer moieties. The stabilizer moieties can be chosen, e.g., for permeability to various SCEs and thus the ease or difficulty with which an SCE can reach or leave the nanoparticle can be selected. The degree to which materials are allowed to move to or from the nanoparticle surface, through the stabilizer layer, out of or into the nanoparticle environment is referred to as "permeability." Highly permeable stabilizer layers to a SCE, e.g., allow for facile movement of the SCE between the nanoparticle surface and environment, while impermeable stabilizers limit this movement. It is to be understood that permeability varies depending on the size and chemical character of the species (SCE) attempting to pass through the stabilizer layer.

In various embodiments, a nanoparticle composition of the present inventions and/or formed by a method of the present inventions has a mean diameter in the range between about 1 nanometer (nm) to about 100 nm. In various embodiments, the composite nanoparticle has a mean diameter in one or more of the ranges between: (a) about 1 nm to about 10 nm; (b) about 10 nm to about 30 nm; (c) about 15 nm to about 50 nm; and (d) about 50 nm to about 100 nm). It is to be understood that the term "mean diameter" is not meant to imply any sort of specific symmetry (e.g., spherical, ellipsoidal, etc.) of a composite nanoparticle. Rather, the composite nanoparticle could be highly irregular and asymmetric.

In various practical applications of nanoparticles, nanoparticle interaction with deactivating compounds, solubility, and/or unwanted aggregation can be a problem. In various embodiments of the present inventions, nanoparticle compositions are provided having a stabilizer that provides solubility and/or prevents aggregation, but allows transport of materials from the nanoparticle environment to the nanoparticle surface and vice versa. In various versions, such embodiments can have practical application in the areas, e.g., of slow-release pharmaceuticals, agrochemicals, corrosion inhibitors, and the like, where the nanoparticle comprises an active agent that is to be released. Modifications to the stabilizer layer can be used to provide nanoparticle compositions with tailored release profiles (such as, e.g., controlled release, sustained release, delayed release, etc); transport rates to the nanoparticle and/or away from the nanoparticle.

For example, in various embodiments, the nanoparticle compositions comprising a stabilizer layer that allows certain SCE transport to and from the nanoparticle can be use in catalysis applications, where, e.g., the transport of chemical reagents to the nanoparticle surface is necessary for the catalytic activity of the nanoparticles. In various embodiments, the stabilizer layer can be chosen to have different transport properties of a SCE to the surface of a nanoparticle than the transport properties of the reaction product of the SCE, activated SCE (e.g., by catalytic activation) away from the SCE. Such differences in transport properties can be used, e.g., to control reaction rates (e.g., by transport to the catalytic surface), provide sufficient time for catalytic activation (e.g., by adjusting transport away from nanoparticle surface), etc. The control of transport to and from the nanoparticle surface of various SCE by selection and/or modification of the stabilizer can be used to adjust or control other factors of chemical processing such as the rate of gas evolution, heat build up, etc. that can be problematic in large scale chemical processing. In various embodiments, the stabilizer layer can have a dynamic aspect, e.g., the stabilizer undergoing a change or series of changes during the catalytic reaction to facilitate further downstream reactions. In various embodiments, the dynamic change can be cyclic (e.g., periodic) facilitating providing a first stabilizer layer for a first reaction, a second stabilizer layer for a second reaction (the second stabilizer formed by a modification of the first layer), followed by reversion to the first stabilizer layer for a new first reaction. It is to be understood that more than two that such cycles or series of stabilizer layers can be used, such as for example, a three-layer cycle or series, a four layer cycle or series, etc. The changes to the stabilizer layer can be initiated by compounds produced in situ and/or addition of compounds and/or external stimuli (e.g., radiation, heat, etc.).

In various embodiments of the present invention, the stabilized nanoparticle, nanoparticle compositions, of the present inventions facilitate providing and/or provide improved optical properties, such as narrower emission spectra, improved fluorescence efficiency, modified fluorescence lifetimes, and the like compared to substantially similar nanoparticles without a stabilizer layer.

C. Nanoparticles

A wide variety of molecules can be used to form the nanoparticle including, but not limited to, organic or inorganic charged ions or a combination thereof. In various preferred embodiments, the nanoparticle comprises an elemental metal, alloy comprising a metal, or a metal species-containing compound, the metal is preferably Cd, Zn, Cu, Pb, Ag, Mn, Ni, Au, Mg, Fe, Hg, Pt or a combination or alloy of one or more thereof. As used herein, by the term "metal species-containing compound" is meant a compound containing a metal or metalloid in any valence state. In various preferred embodiments, the nanoparticle comprises semiconductor crystals, including, but not limited to, CdS, CdSe, CdTe, ZnS, ZnSe, ZnTe, PbS, PbSe, PbTe, CuI, HgS, HgSe, and HgTe. These semiconductors can be ternary or quaternary semiconductors, including, but not limited to, CdTe/S, CdSe/S, CdTe/Se, Cd/ZnTe, Cd/ZnSe/Te, and the like. In various preferred embodiments, the nanoparticle comprises oxides, such as ZnO, $SnO_2$, CoO, NiO, CdO, $InO_2$, and the like. In various preferred embodiments, the nanoparticle comprises more complex systems, including alloys such as Ag/Au, Ag/Cu, Au/Cu, phosphates such as $LiFePO_4$, chromates such as $PbCrO_4$, and the like.

D. Stabilizing Moieties

The nanoparticle compositions of the present inventions comprise a nanoparticle preferably surrounded by at least one stabilizer moiety. A stabilizer moiety for use in the present inventions can be any molecule capable of collapse that contains units of monomers, that can be synthetic or naturally occurring and can be linear, branched, hyperbranched, and/or dendrimeric.

When considering various practical applications of the present inventions, there are three main functions of a stabilizer. One function can be to modify and/or control the interactions of the nanoparticles with each other and/or with a solvent, e.g., to provide certain solubility characteristics or to prevent aggregation. A second function can be to prevent transport of other materials dissolved in the nanoparticle environment (e.g., tissue, solvent, air, etc.) to the nanoparticle surface, which, e.g., can often cause deactivation of nanoparticle properties, such as, e.g., fluorescence. A third function can be to prevent release of the material comprising the nanoparticle into the nanoparticle environment (e.g., tissue, solvent, air, etc.), e.g., to prevent the nanoparticle from decomposing or dissolving into its component parts, eliciting a toxic response, etc. It is to be understood that the second and third functions can apply to nanoparticles in gaseous systems as wells as those in a liquid environment.

In various preferred embodiments of the present inventions, the stabilizing moiety comprises one or more polymers with ionizable or ionized groups. An ionizable moiety or group is any chemical functional group that can be rendered charged by adjusting solution conditions, while ionized moieties refers to chemical functional groups that are charged regardless of solution conditions. An ionizable moiety also includes any chemical functional group that can be rendered charged by the use of radiation or by the use of a static electromagnetic field. The ionized or ionizable moiety or group can be either cationic or anionic, and can be continuous along an entire chain as in the case of regular polymers, or can be interrupted by blocks containing different functional groups, as in the case of block polymers.

Examples of polymer stabilizers suitable in various embodiments include, but are not limited to, polyelectrolytes such as, e.g., poly(acrylic acid), poly (styrene sulfonate), poly(diallyldimethylammonium chloride), poly(allylamine hydrochloride) (PAH), or others. Suitable examples of adsorbates include similar polyelectrolytes. In various preferred embodiments employing an adsorbate, the polymer stabilizer is of a larger molecular weight than the adsorbate moieties.

In various embodiments, a preferred cationic group is the amino group and preferred anionic groups are carboxylic acid, sulfonic acid, phosphates, and the like. For cationic polymers, examples include, but are not limited to, poly(allylamine), poly(ethyleneimine), poly(diallyldimethylammonium chloride), poly(arginine), chitosan, cationic collapsible proteins, poly(methacrylamido propyl trimethyl ammonium chloride) and poly(lysine). For anionic polymers, examples include, but are not limited to, poly(acrylic acid), poly(styrene sulfonic acid), poly(glutamic acid), poly(methacrylic acid), poly(aspartic acid), nucleic acids, anionic collapsible proteins, poly (anetholesulfonic acid), cellulose, poly(maleic acid) poly(vinyl phosphoric acid), etc. Block polymers are made up of blocks of polymers having different functional groups. The block polymers can be made up of blocks of any of the mentioned anionic and cationic polymers and another polymer that imparts a specific desirable property to the block polymer.

E. Formation of Nanoparticle Compositions & Modification of Stabilizer Layer In various preferred embodiments of the present inventions, a polymer-stabilized nanoparticle composition of the present inventions is produced in a suitable solvent by collapse of a stabilizer moiety about a nanoparticle or nanoparticle precursor moiety. A wide variety of solvents can be used to form a solution of use in the present inventions. In various embodiments, the solution is preferably an aqueous solution.

In preferred embodiments of the present inventions, a chosen stabilizer moiety is dissolved in a suitable solvent to form a solution of the stabilizer. The solvent can be water, an organic solvent or a mixture of two or more such solvents. The addition to the solution of the collapsing agent induces a collapse of the stabilizer about the nanoparticle or nanoparticle precursor. The collapsing agent can itself be the nanoparticle or nanoparticle precursor. For example, the nanoparticle or nanoparticle precursor can be an inorganic salt that is water soluble where the water soluble inorganic salt is of the form $M_xA_y$, where M is a metal cation belonging to Groups I to IV of the Periodic Table possessing a charge +y and A is the counter ion to M with a charge −x or a combination thereof.

Various preferred embodiments of the present inventions involve the formation of composite nanoparticles by the addition of ions that induce precipitate formation of the nanoparticle or nanoparticle precursor within the collapsed stabilizer, wherein the stabilizer is intra-molecularly and/or inter-molecularly cross-linked. As used herein, "precipitation" of a nanoparticle or nanoparticle precursor having a stabilizer layer refers to modification of the ion to a compound that is substantially insoluble in the solvent of the solution.

Collapsing agents are usually water-soluble inorganic salts, most preferably, those that contain metal cations and their corresponding anions. Examples of collapsing agents include, but are not limited to, $Cd(NO_3)_2$, $Zn(NO_3)_2$, $CU(SO_4)$, $Pb(NO_3)_2$, $Pb(CH_3COO)_2$, $Ag(NO_3)$, $Mn(SO_4)$, $Ni(NO_3)_2$.

A variety of techniques can be used to collapse the stabilizer around a nanoparticle or nanoparticle precursor. For example, in various embodiments a collapsing agent such as a different solvent, an ionic species (e.g., a salt); or combinations thereof can be used. In various embodiments, it is preferred that the nanoparticle or nanoparticle precursor itself serve as a collapsing agent. Multiple collapsing agents can be used.

In various embodiments, to retain the collapsed conformation of the stabilizer layer, cross-linking of the collapsed stabilizer is achieved by exposing the polymer to γ-radiation or UV radiation. Preferably, the UV radiation is UV laser radiation or UV arc lamp radiation. In various embodiments, intra-molecular cross-links are chemically produced, for example, with carbodiimide chemistry with a homobifunctional cross-linker.

In preferred embodiments, the polymer stabilizer moiety or moieties are at least partially crosslinked so that the favorable solubility and non-aggregative properties of the nanoparticle composition are maintained. In various embodiments, the stabilizer layer is stabilized by inter-molecular crosslinks to form a gel.

1. Crosslinking in General

The polymer stabilizer is preferably chosen to be susceptible to chemical or physical crosslinking. In various embodiments, control of the permeability of the stabilizer to SCEs, e.g., modification of the stabilizer layer, is achieved through control of the degree of crosslinking of the stabilizing polymer. For example, by increasing the degree of chemical crosslinking, the permeability of the stabilizer to SCEs can be decreased.

A wide variety of means can be used to cross-link the stabilizer layer, for example: chemical means through radical reactions of pendant groups containing unsaturated bonds; through the use of molecules having multifunctional groups than can react with the functional groups of the stabilizer moiety; though high-energy radiation, such as, e.g., gamma radiation.

Crosslinking can be achieved through chemical means through introduction of multidentate molecules as crosslinkers. These molecules contain multiple functional groups that can form covalent bonds with the functional groups on the stabilizer moieties. These molecules can be linear, branched, or dendrimeric. For example, a molecule containing multiple amine groups, such as 2,2'-ethylenedioxydiethylamine can effect the intramolecular crosslinking of poly(acrylic acid). The cross-linking reaction in this case can be promoted by the addition of an activating agent, typically used for amide bond formation, such as a carbodiimide.

Chemical treatment can also be carried out to derivatize the stabilizer layer, such that a fraction of the ionizable groups are converted to groups that can be cross-linked through free-radical reactions. An example is to convert some of the carboxylic acid groups of poly(acrylic acid) to allyl esters. The allyl groups can then be reacted to form intramolecular bonds through radical chemistry.

Crosslinking by irradiation can be effected by exposing a solution of the collapsed stabilizer to an electromagnetic radiation source. The radiation source can be, for example, an excimer laser, a mercury arc lamp, a light emitting diode, a UV germicidal lamp or gamma rays. For the purposes of this specification, crosslinking through means such as irradiation shall be referred to as "physical crosslinking."

The degree of chemical cross-linking can be controlled by controlling the relative concentration of multidentate molecules, activating agents, or other reactive groups. The degree of physical cross-linking can be controlled by controlling the dose, wavelength, or type of radiation to which the polymer-stabilized nanoparticles are exposed.

2. Stabilizing Layer Modifications

In various aspects, the present inventions also provide methods to modify the properties of the stabilizer so that, in various embodiments, nanoparticles compositions having stabilizers with specific desired transport properties of material to and/or from the nanoparticle environment to and/or from the nanoparticle surface, and vice versa, can be produced.

In various preferred embodiments, the step modifying a stabilizer layers occurs after collapse of the stabilizer moieties about a nanoparticle or nanoparticle precursor but prior to cross-linking of the stabilizer layer; substantially during or concurrent with cross-linking of the stabilizer layer; after cross-linking of the stabilizer layer; or a combination of one or more of prior to, during, concurrently and after cross-linking of the stabilizer layer.

In various embodiments, selection of the permeability and/or other properties of the stabilizer layer are provide for by selecting the degree of intra-molecular and/or intermolecular cross-linking of the stabilizer moieties. FIG. 1 schematically depicts a nanoparticle composition (102) comprising a nanoparticle (NP), or nanoparticle precursor, and a stabilizer moiety layer (104). FIG. 1 illustrates that increasing the degree of intra-molecular cross-linking (106) of the stabilizing moieties (situation A) decreases the permeability of the stabilizer layer to a SCE (108), whereas decreasing the degree of intra-molecular cross-linking (situation B) increase the permeability of the layer.

In various embodiments of the present inventions, a polymer-stabilized nanoparticle is provided in a suitable solvent. The polymer stabilizer moieties are chosen to have a three-dimensional structure that is sensitive to solution conditions such as pH, temperature, solvent, ionic strength, etc. Non-limiting examples of such polymers are polymers with ionizable groups, where interactions between these ionizable groups can control the three-dimensional structure of the polymer. In various versions of c=such embodiments, control of the permeability of the stabilizer to SCEs can be achieved, through control of the three-dimensional structure using changes in solution conditions. In preferred embodiments, the polymer stabilizer moiety or moieties are at least partially crosslinked so that the favorable solubility and non-aggregative properties of the nanoparticle composition are maintained.

Changes in the three-dimensional structure of ionized or ionizable polymers can be effected, e.g., using changes in pH, temperature, solvent, ionic strength, etc. Normally in solution, at high charge density, e.g., when "monomer" units of the stabilizer polymer are fully or highly charged, an extended conformation is adopted due to electrostatic repulsion between similarly charged monomer units. Decreasing the charge density of the polymer, which can be effected through addition of salts or a change of pH, can result in the transition of extended polymer chains to a collapsed conformation. If, instead of being able to freely interact with the solution, the polymer is in a non-extended conformation, changes in charge density on the polymer can result in swelling or contraction of the polymer. The non-extended conformation can occur even at high charge density if, for example, the polymer has formed a collapsed conformation and was then internally crosslinked chemically or physically. For example, even if the initial cause of collapse is removed the polymer may retain its basic collapsed shape, though it may swell or contract depending on conditions. This can also occur if the polymer is externally crosslinked with other polymers (inter-molecular crosslinking), e.g., forming a gel. Cross-linking the stabilizer layer (both by intra-molecular and/or inter-molecular crosslinking) can provide to a polymer system with a substantially inflexible shape. Where one or more stabilizer layers have a substantially inflexible shape, increases in charge density can lead to repulsion between the monomers of the stabilizer polymers. Since the polymers are not able to adopt an extended conformation, they will instead swell, substantially maintaining the shape of the layer but increasing in porosity. Similarly, decreases in charge density can lead to a reduction in repulsive interactions of the monomers of the polymers, leading to contraction of the stabilizer layer.

Contraction or swelling of the polymer stabilizer layer can be similarly effected by changing solvent conditions. For example, replacement of a first solvent with a second solvent with which the polymer has decreased favorable interactions with will encourage contraction of the polymer stabilizer. Similarly, replacement of a first solvent with a second solvent with which the polymer has increased favorable interactions will encourage swelling of the polymer stabilizer. In various versions of these embodiments, suitable stabilizers include polymers stabilizers that have ionizable groups and dissimilar interactions with different solvents. In various preferred embodiments, the polymer stabilizer is soluble in both the first and second solvents in order to maintain favorable solubility and non-aggregative properties of the stabilized nanoparticle.

Examples of suitable solvent systems include, but are not limited to, water-soluble polymers where the first solvent is aqueous and the second solvent is a combination of water and ethanol; alcohol-soluble polymers where the first solvent is a small-chain alcohol and the second solvent is a longer-chain alcohol and the like.

Figure 2:
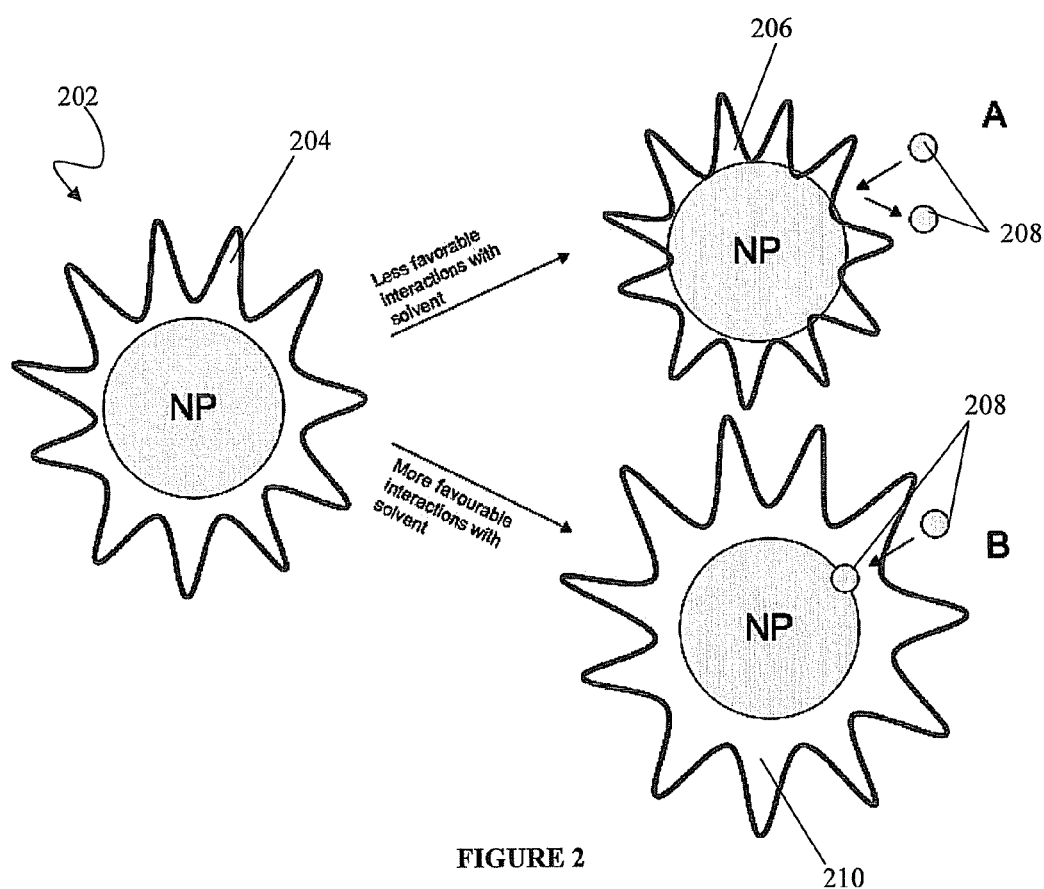

Modification of the three-dimensional structure of the polymer stabilizer, e.g., by swelling or contraction of the polymer can be used to change the permeability of the polymer stabilizer to SCEs. For example, FIG. 2 schematically depicts a nanoparticle composition (202) comprising a nanoparticle (NP) or nanoparticle precursor, and a stabilizer moiety layer (204). FIG. 2 illustrates that that less favorable interaction of the stabilizing moieties of the layer (204) with the solvent (situation A) can result in contraction of the stabilizer moiety layer (206) and reduce permeability to a SCE (208). A composition with a more favorable interaction of the stabilizing moieties with the solvent (situation B) resulting in expansion of the stabilizer moiety layer (210) and an increased permeability to a SCE (208).

Suitable means to modify the stabilizer to change its permeability to SCEs also include methods to modify stabilizing moieties to increase or decrease the size of the stabilizing moieties. The means can include, e.g., physical or chemical absorption or desorption of additional chemical entities (e.g., adsorbates), which can be polymers, ligands, coordinating complexes, or combinations thereof. The means can further comprise a chemical reaction to assist in the adsorption or desorption process. For example, in various embodiments, the stabilizing moiety is further functionalized to improve compatibility with the further adsorbed species. In various embodiments, this adsorption or desorption process occurs subsequent to the production of a stabilized nanoparticle, during the production of a stabilized nanoparticle, or both.

For example, in various embodiments, an adsorbate moiety is added to a polymer-stabilized nanoparticle while the polymer-stabilized nanoparticle is being synthesized. In various preferred embodiments, the polymer stabilizer is a polymer with ionizable groups, e.g., a polyelectrolyte, and the nanoparticle is formed using a collapse transition of the polyelectrolyte. The adsorbate moiety is added to the solution prior to the collapse transition, subsequent to the collapse transition, or both, and interacts with the collapsed polyelectrolyte. In various preferred embodiments, the adsorbate is a lower molecular-weight polyelectrolyte than the polymer stabilizer. As a non-limiting example, low molecular weight PAA or PAH can be added to a polymer solution of large molecular weight PAA prior to collapse and formation of a nanoparticle having a stabilizer layer. The low molecular weight polyelectrolyte can interact with the polymer stabilizer to decrease the permeability of the stabilizer layer to SCEs.

In various embodiments of the present inventions, a polymer-stabilized nanoparticle is provided in a suitable solvent. Subsequent treatment of the polymer-stabilized nanoparticle with an adsorbate moiety results in a thicker or denser polymer-adsorbate composite stabilizer layer. This adsorbate, can be chemically and/or physically adsorbed to the polymer stabilizer, e.g., the adsorbate can be covalently bound to the polymer stabilizer, physisorbed, etc. The polymer-adsorbate composite stabilizer can decrease the permeability of the stabilizer layer to SCEs.

In various embodiments, a stabilizer layer of a polymer-stabilized nanoparticle comprises a component that can be desorbed or cleaved from the polymer stabilizer, resulting in a sterically less thick or dense polymer stabilizer layer with increased permeability to SCEs.

Figure 3:
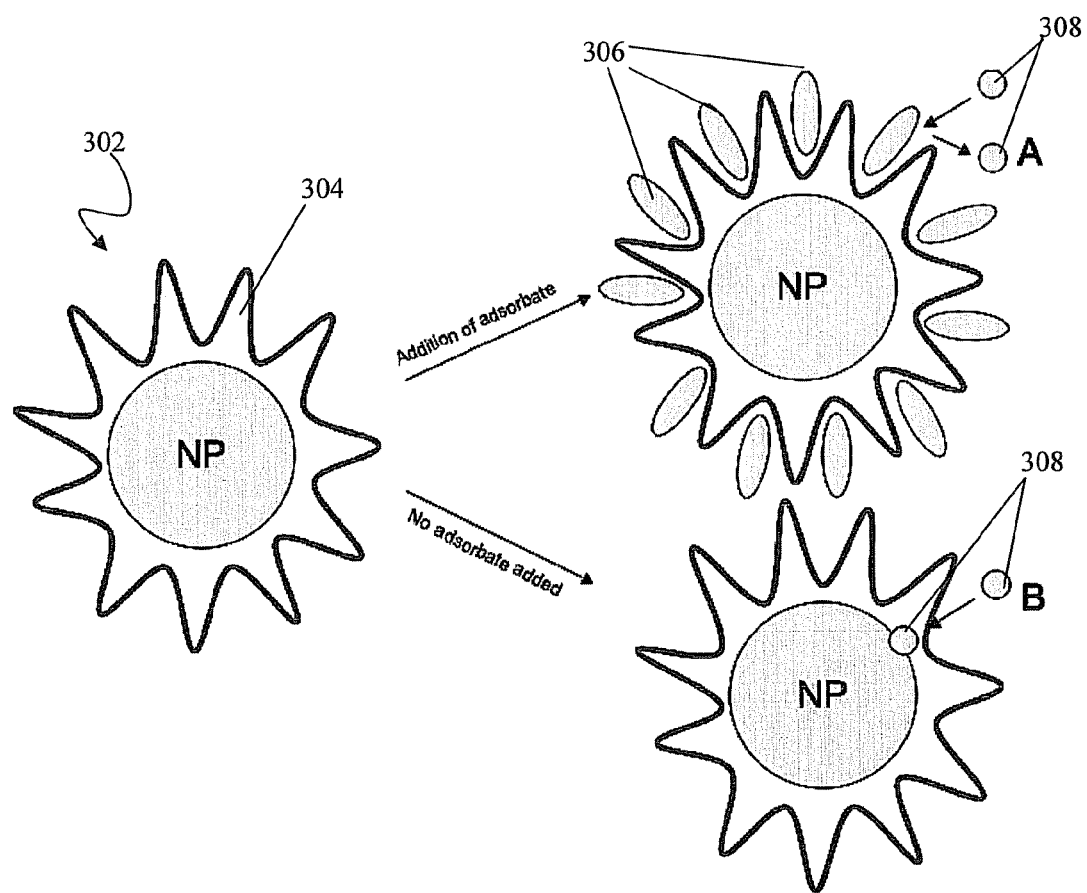

For example, FIG. 3 schematically depicts the modification of a nanoparticle composition (302) comprising a nanoparticle (NP) or nanoparticle precursor, and a stabilizer moiety layer (304). Addition of an adsorbate moiety (306), e.g., by functionalization, adsorption, absorption, cleavage, etc., can be used to modify the stabilizer layer (situation A) and reduce permeability to a SCE (308) as compared to a substantially similar stabilizer layer without an adsorbate (situation B).

In various embodiments, the adsorbate moiety has one or more functional groups that can be used for conjugating the stabilized nanoparticles to other molecules containing complementary functional groups. Examples of such molecules include, but are not limited to, protein, ligand, oligonucleotide, aptamer, carbohydrate, lipid, other nanoparticles, any member of affinity-binding pairs (such as, e.g., antigen-antibody, DNA-protein, DNA-DNA, DNA-RNA, biotin-avidin, hapten-antihapten, protein-protein, enzyme-substrate), and combinations thereof.

In various embodiments, at least portion of the functional groups of the adsorbate moiety can be modified to convert them to other functional groups that can be used, e.g., for conjugation. For example, a hetero bi-functional molecule containing an amine group and a latent thiol group can be reacted with poly (acrylic acid)-adsorbed nanoparticles through amide bond formation thereby converting the carboxylic acid to a thiol group. The thiol group can be used, e.g., for conjugation to other molecules containing thiol-reactive groups.

In various embodiments, in addition to modifying the thickness or density of the polymer-adsorbate stabilizer layer the adsorbate can modify the chemical properties of the polymer-adsorbate stabilizer. In various embodiments, this can be used to enhance or retard changes to the permeability of the stabilizer layer to SCEs caused by the changes in the thickness or density of the polymer-adsorbate stabilizer. For example, a polymer-adsorbate stabilizer having a different net charge than the polymer stabilizer alone, would modify the net charge and thereby can be used to modify the permeability of the stabilizer layer to charged SCEs.

In various preferred aspects, the stabilizer layer is composed of one or more bilayers. For example, in various preferred embodiments, a polymer-stabilized nanoparticle is provided in a suitable solvent. The polymer stabilizer is one or more polymer moieties with ionizable groups where at least some of the ionizable groups are partially or completely ionized. The presence of the ionized groups gives the polymer stabilizer a net charge, e.g., positive or negative. Addition of a polymer or other adsorbate with opposite charge can result in adsorption of the adsorbate to the initial polymer stabilizer layer, resulting in a polymer-adsorbate stabilizer. This process can be continued in a so-called "layer-by-layer" fashion, where layers of adsorbates of opposite charge are added alternately. A pair of moieties (e.g., adsorbates, stabilizers, etc.) that are subsequently added of opposite charge is referred to herein as a bilayer.

In various embodiments of the present inventions, individual layers of stabilizer moiety and adsorbed polymer stabilizing layer can be crosslinked together using radiation, chemically, or by heating. High energy radiation in the form of UV lamps, gamma irradiation, particulate radiation, and the like can be used to generate free radicals to participate in a cross-linking process. In various embodiments, bifunctional ligands such as EDC can be used to covalently bond carboxylate groups from adjacent layers together. In various embodiments, heating can be used to generate crosslinks between two layers of stabilizing polymers. An example of this process would be where the first layer contains carboxylate groups and the second layer contains amine groups, where heating promotes the formation of an amide covalent bond between the two layers.

Figure 4:
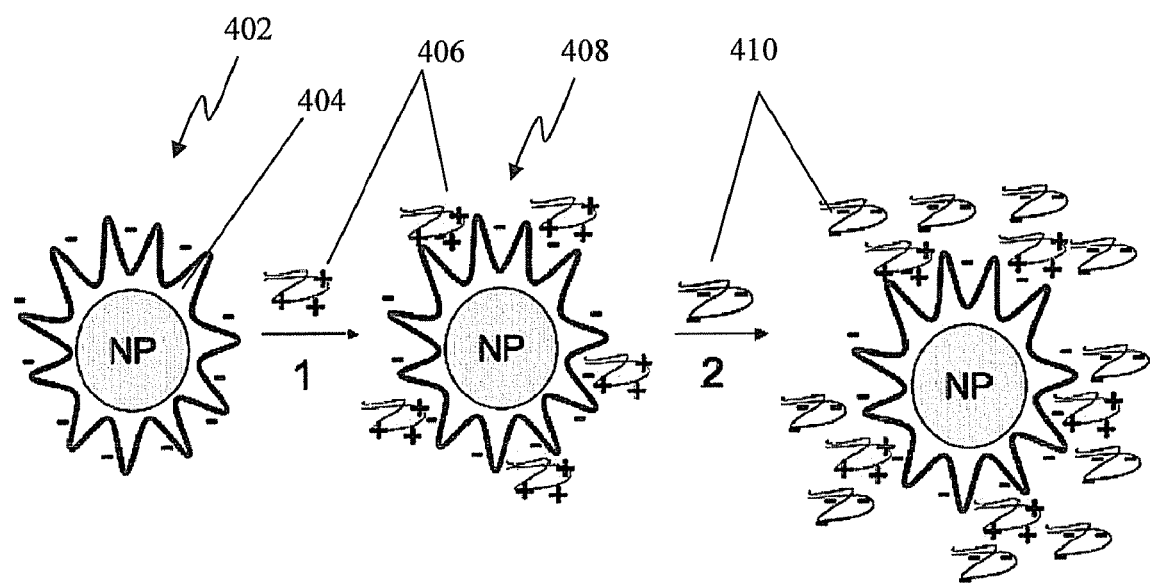

For example, FIG. 4 illustrates various embodiments of a "layer-by-layer" assembly. A nanoparticle composition (402) comprising a nanoparticle (NP) or nanoparticle precursor, and a stabilizer moiety layer (404) having a net charge, is contacted with another stabilizer moiety or adsorbate (406), with an opposite net charge, (step 1) to form a new nanoparticle composition (408). The steps can be repeated, a stabilizer moiety or adsorbate moiety being added (410) of net charge opposite to the proceeding moiety (406) to assemble additional layers (e.g., full or partial bilayers of polyelectrolytes) on the stabilized nanoparticle (402).

F. Permeability

The permeability of a stabilizer layer can be ascertained by a number of methods. For example, a stabilized nanoparticle can be added to an etchant (e.g., HCl for CdS) and the rate of dissolution measured, the rate of dissolution being be proportional to the rate of H+ in and Cd out, which can be monitored, e.g., by watching the intensity and position of a fluorescence peak of CdS. Another method involves measuring the rate of dissolution/leaching of a metal nanoparticle from the stabilized nanoparticle into solution as a cationic metal (and thus outside the stabilizer layer), e.g., as in bioavailability studies. Another approach is to monitor a property of the nanoparticle or nanoparticle precursor during collapse and/or modification of the stabilizer moiety in the presence of a compound that deactivates a property nanoparticle or nanoparticle precursor, e.g., example, monitoring CdS fluorescence in the presence of EDTA, a deactivator of CdS fluorescence.

G. Catalytic Supports

In various aspects, the present inventions provide stabilized nanoparticles supported by a substrate. In various embodiments, supported, stabilized nanoparticles can be used, e.g., in heterogeneous processes where supported nanoparticles interact with gas- and/or liquid-borne SCEs, such as, for example, in heterogenous catalysis. For example, in various embodiments, stabilized nanoparticles are supported on the substrate (e.g., activated carbon), on the surfaces of the pores of a mesoporous material, or a combination thereof, for catalysis of gas and/or liquid-borne SCEs. Examples of mesoporous materials include, but are not limited to, zeolitic materials, aluminosilicates, clays, and other porous silicates.

A wide variety of substrates can be used as supports, and include any solid phase material upon which a stabilized nanoparticle can be immobilized. Examples of substrate materials include, but are not limited to, activated carbon, mesoporous materials, zeolites, organic polymers, inorganic surfaces, such as, e.g., glass, controlled pore glass, silica, metals, alloys, etc., and combinations thereof. The support can have a variety of forms and form factors, including, but not limited to, beads, spheres, particles, granules, gels, membranes, surfaces. Surfaces can be a variety of shapes, including, but not limited to, planar, substantially planar, or non-planar. Supports can be porous, non-porous or a combination of both, and can have swelling and/or non-swelling characteristics.

In various preferred embodiments, a 'layer-by-layer' assembly process as described herein, such as, for example, in section F, can be used to fashion supported, stabilized nanoparticles. For example, in various preferred embodiments, a polymer-stabilized nanoparticle is provided in a suitable solvent. The polymer stabilizer comprising one or more polymer moieties with ionizable groups where at least some of the ionizable groups are partially or completely ionized. The presence of the ionized groups can give the polymer stabilizer a net charge, e.g., positive or negative. A substrate with a net surface charge of opposite character can be exposed to a solution of these nanoparticles which can result in absorption of nanoparticles to the surface. Addition of a polymer, stabilized nanoparticle, bare nanoparticle, or other adsorbate with opposite charge can result in adsorption of the adsorbate to the initial stabilized nanoparticle layer. The process can be continued in a so-called "layer-by-layer" fashion, where layers of adsorbates of opposite charge can be added alternately. A pair of moieties (e.g., adsorbates, stabilizers, etc.), where one member of the pair has a net positive charge and the other a net negative charge, can together be referred to herein as a bilayer.

In various embodiments, each bilayer can comprise stabilized nanoparticles of the appropriate charge in one and/or both of the layers, which, for example, can be used to modify the loading of stabilized nanoparticle in the layered substrate. In various embodiments, one or more of the bilayers does not comprise and/or is substantially free of nanoparticles, for example, to decrease the loading of nanoparticles in the layered substrate.

The porosity of the layered substrate can be modified, for example, by changing solution conditions during deposition such as pH, ionic strength, solvent, concentrations, etc. Increased porosity facilitates improving the diffusion of materials through the layered substrate, while decreased porosity can, e.g., increase the strength of coordination and barrier effects.

In various embodiments, the layered substrate is loaded with stabilized nanoparticles with specific catalytic activity such as metals, metal alloys, oxides, and the like. In various embodiments, the stabilizers have increased or decreased porosity to SCEs.

In various embodiments, a layered substrate comprising nanoparticles is sintered in a furnace in order to enhance interconnectivity of the nanoparticles and/or burn off stabilizer and/or other adsorbate moieties. This can result, e.g., in a porous substrate comprising at least one type of nanoparticle. In various embodiments, this porous substrate is used as a catalyst. In various embodiments the porous substrate comprises an oxide. In various embodiments the porous substrate comprises, a porous oxide that can, e.g., act as a Lewis base in a catalytic reaction.

EXAMPLES

Various aspects and embodiments of the present inventions may be further understood in light of the following examples, which are not exhaustive and which should not be construed as limiting the scope of the present inventions in any way.

Example 1

Preparation of CdTe-CdS Nanoparticles Encapsulated in PAA

A 10 mM sodium tellurite ($Na_2TeO_3$) solution was prepared by weighing out the appropriate amount of sodium tellurite and dissolving it in deionized water ($ddH_2O$). A heating mantle was heated to >100° C. 50 mL of Cd-PAA solution (1.67 mM Cd, irradiated for 1 h with 254 nm light) was put into a one-necked round bottom flask (rbf). Trisodium citrate (50 mg) and sodium borohydride ($NaBH_4$, 25 mg) was added in one portion to the stirred Cd-PAA solution. 1.25 mL $Na_2TeO_3$ solution, prepared above, was added to the Cd-PAA solution. A condenser was put on rbf and the reaction mixture was heated to reflux in the heating mantle and lef to reflux for 4 h. Meanwhile, another heating mantle was preheated to 50° C. After 4 h of reflux, the reaction flask was taken out of the heating mantle and let cool to room temperature. Meanwhile, a 100 mM solution of thioacetamide was prepared by weighing out the appropriate amount of thioacetamide and dissolving it in deionized water ($ddH_2O$). For quantum dots that emit in the green, 33 µL of thioacetamide solution was added to the reaction mixture. For yellow quantum dots, 150 µL of thioacetamide was used. For orange quantum dots, 675 µL of thioacetamide solution was used. After adding thioacetamide, the flask was put into the heating mantle pre-heated to 50° C. The reaction was left at 50° C. for 16 h, then let cool to room temperature. The fluorescence of the yellow and orange quantum dots are shown in FIGS. 10 and 11 respectively.

Example 2

Preparation of CdTe-CdS Nanoparticles Encapsulated in PAA/PSS

A 10 mM sodium tellurite ($Na_2TeO_3$) solution was prepared by weighing out the appropriate amount of sodium tellurite and dissolving it in deionized water ($ddH_2O$). A heating mantle was heated to >100° C. 50 mL of Cd-PAA/PSS (PSS is 5% or 25% of PAA by weight) solution (1.67 mM Cd, irradiated for 1 h with 254 nm light) was put into a one-necked round bottom flask (rbf). Trisodium citrate (50 mg) and sodium borohydride ($NaBH_4$, 25 mg) was added in one portion to the stirred Cd-PAA solution. 1.25 mL $Na_2TeO_3$ solution, prepared above, was added to the Cd-PAA solution. A condenser was put on rbf and the reaction mixture was heated to reflux in the heating mantle and lef to reflux for 4 h. Meanwhile, another heating mantle was preheated to 50° C. After 4 h of reflux, the reaction flask was taken out of the heating mantle and let cool to room temperature. Meanwhile, a 100 mM solution of thioacetamide was prepared by weighing out the appropriate amount of thioacetamide and dissolving it in deionized water ($ddH_2O$).). For quantum dots that emit in the green, 33 µL of thioacetamide solution was added to the reaction mixture. For yellow quantum dots, 150 µL of thioacetamide was used. For orange quantum dots, 675 µL of thioacetamide solution was used. After adding thioacetamide, the flask was put into the heating mantle pre-heated to 50° C. The reaction was left at 50° C. for 16 h, then let cool to room temperature. The fluorescence of the yellow and orange quantum dots with 5% and 25% PSS are shown in FIGS. 10 and 11 respectively.

Example 3

Preparation of CdTe-CdS Nanoparticles Coated with Bilayers of Polyelectrolytes

Samples of quantum dots coated with 1, 2, or 3 bilayers of PAA and PAH were prepared. The green CdTe-CdS quantum dots with a PAA stabilizer were prepared according to Example 2, purified by precipitation with ethanol, and reconstituted at 16 times its original concentration (on a solids basis). It was then diluted 333 times with deionized, distilled water (ddH2O). To 100 µL of this solution was added alternately solutions of PAH (MW=15,000, 40 µL, 0.03 mg/mL) and PAA-Na (MW=2,100, 5 µL, 0.3 mg/mL). After each addition, the mixture was put on an orbital shaker for 5 minutes and then the next solution was added.

For CdTe-CdS nanoparticles with one bilayer (i.e. after one alternate addition of PAH and PAA-Na), after one alternate addition of PAH and PAA-Na the solution was removed from the shaker and 90 μL of deionized, distilled water was added. For CdTe-CdS nanoparticles with two bilayers, after two alternate additions of PAH and PAA-Na the solution was removed from the shaker and 45 μL of ddH2O was added. For CdTe-CdS nanoparticles with three bilayers, after three alternate additions of PAH and PAA-Na the solution was removed from the shaker and used.

Example 4

Polyelectrolyte Stabilizer Effect on CdTe-CdS Quantum Dot Photoluminescence

Two sets of samples of quantum dots were prepared using a modified version of example 1. In this case, the green CdTe-CdS quantum dots were prepared according to Example 1 and diluted 10 times. The amounts of PAH and PAA-Na added were also modified—each bilayer involved the addition of 10 μL of each solution at concentrations of 0.5 mg/mL and 0.05 mg/mL respectively.

Figure 5:
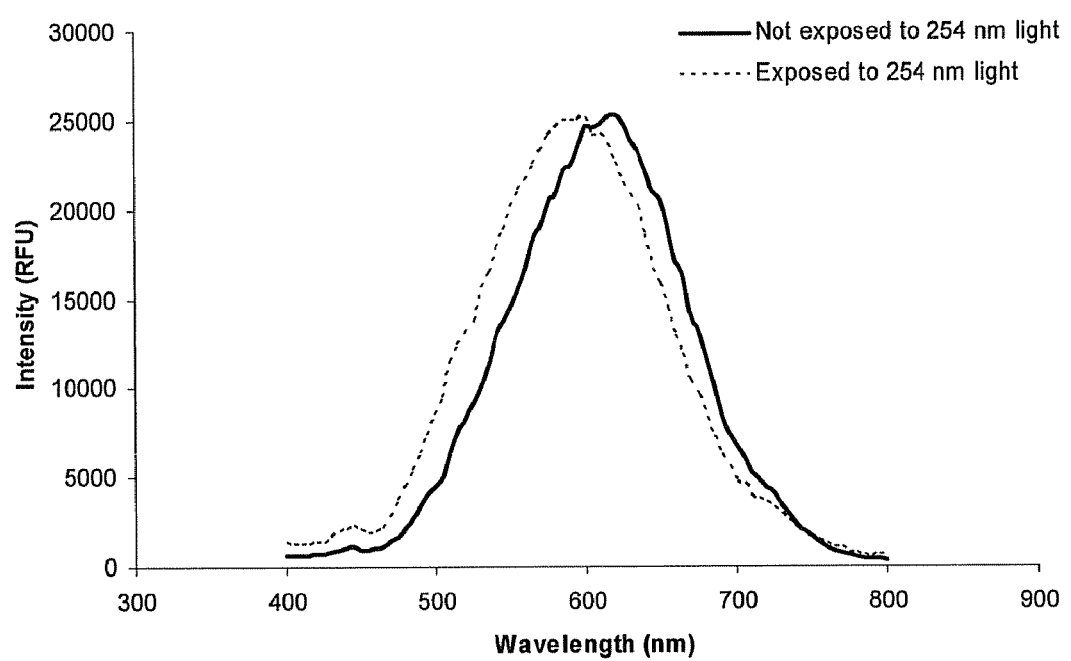
Figure 6:
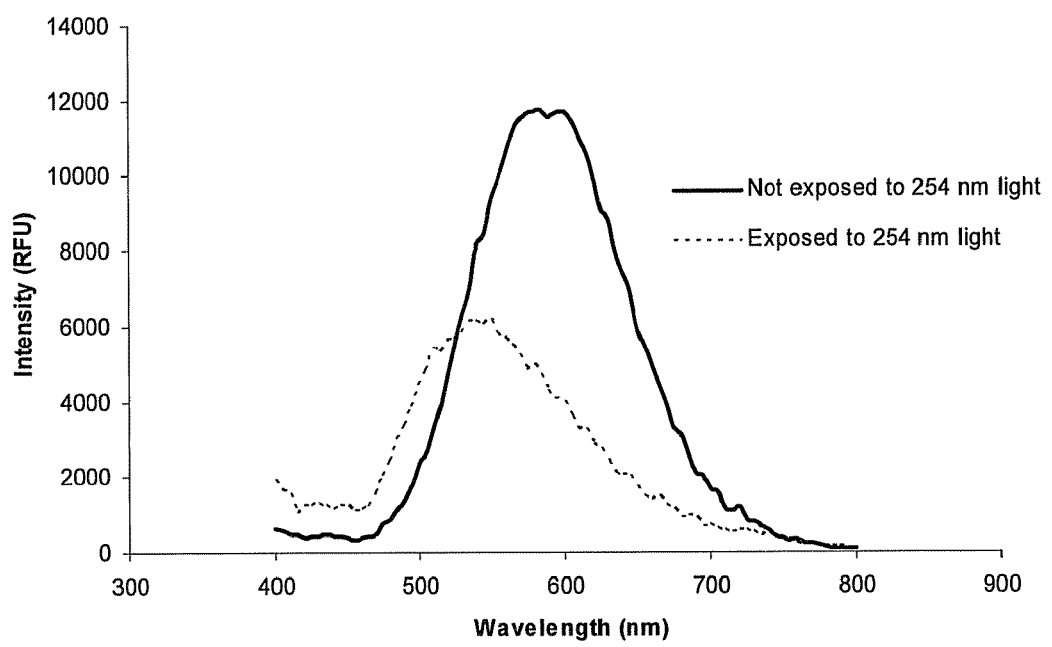

One set of quantum dots was exposed to high intensity UV radiation (254 nm) for 30 minutes while another set was kept covered with aluminum foil tape. The photoluminescence spectra are shown in FIG. 5. As control, two sets of solutions of quantum dots without bilayers of PAH and PAA-Na were prepared and diluted 10 times; one set was exposed to high intensity UV radiation (254 nm) for 30 minutes while another set was kept covered with aluminum foil tape. The photoluminescence spectra are shown in FIG. 6.

Example 5

Effect of Crosslinking on CdS Quantum Dot Photoluminescence $Cd^{2+}$/PAA was prepared by mixing equal volumes of aqueous 2 mg/mL Polyacrylic acid (1.2 million MW, Sigma) with 3.3 mM $Cd(NO_3)_2$. Briefly, 10.0 mL of the polyacrylic acid solution was placed in a plastic beaker with 10 mL of water and stirred vigorously with a magnetic stir bar. To this solution, 90 mL of polyacrylic acid solution along with 90 ml of $Cd(NO_3)_2$ were added dropwise at a rate of 5 ml/minute under vigorous stirring. To the resulting solution, 10 more ml of $Cd(NO_3)_2$ was added dropwise at a rate of 2-3 ml/min with vigorous stirring. The resulting solution was a clear liquid.

Figure 7:
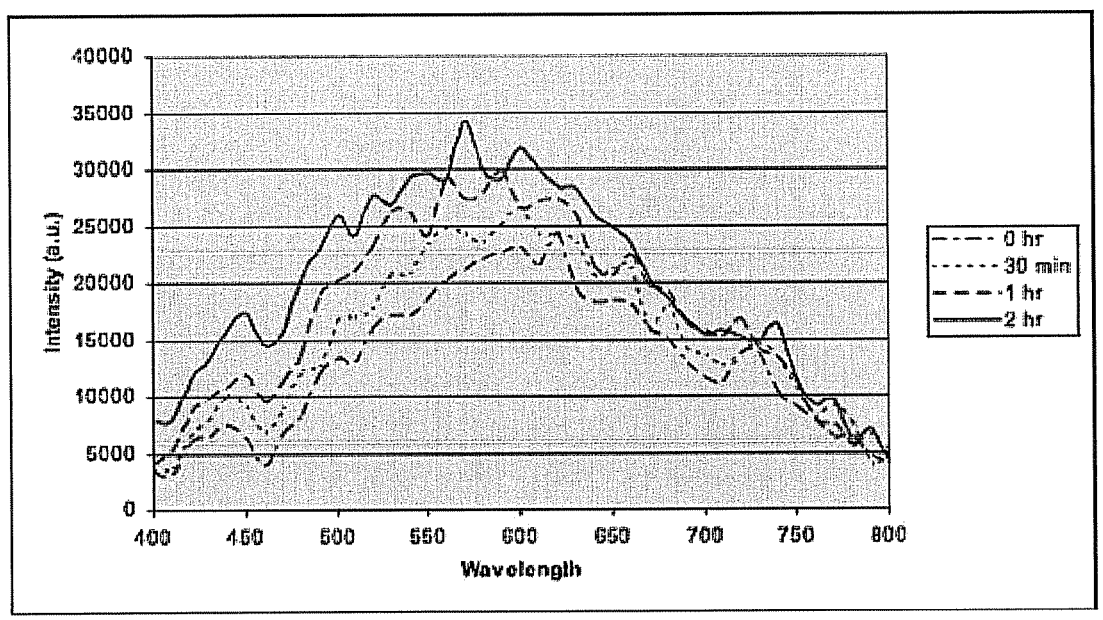

The $Cd^{2+}$/PAA was crosslinked under a UV Germicidal lamp and aliquots at different crosslinking times were taken (0 mins, 30 mins, 1 hr, 1.5 hrs, and 2 hrs). CdS/PAA was made using $Cd^{2+}$/PAA (crosslinked at different times)—180 μL of 2.8 mM $Na_2S$ solution was added to 500 μL of $Cd^{2+}$/PAA solution. The resulting UV visible and emission spectra is shown in FIG. 7 for CdS/PAA formed using $Cd^{2+}$/PAA that was crosslinked at different times (0 hours, 30 mins., 1 hour, and 2 hours).

Example 6

Photocatalytic Activity of ZnO Nanoparticles

100 μL of methylene blue solution (0.1 mM) was added to two separate solutions containing 100 uL of ZnO nanoparticles with a PAA stabilizer (0.5 mg/mL based on PAA concentration). The ZnO nanoparticles were prepared as described in Goh et al., PCT application CD 2006/001686. Two control solutions were also made with 100 μL of ddH2O and 100 μL of methylene blue solution. The solutions were kept in the dark.

After 3.5 hours, one solution with ZnO nanoparticles and one without was exposed to UV radiation (302 nm) and the other solutions were kept covered with aluminum foil. Absorbance measurements were taken after 5, 30, 60, and 189 minutes and are shown in FIG. 8. In the absence of ZnO nanoparticles little decrease in absorbance was observed, and accelerated breakdown was shown for methylene blue in the presence of ZnO.

Example 7

Measurement of Cadmium Content in Unbound Form for Stabilized CdTe-CdS Nanoparticles Green CdTe-CdS nanoparticles with 1, 2, and 3 bilayers of PAH and PAA were prepared as described in Example 1. A control solution of CdTe-CdS nanoparticles with 0 bilayers was also prepared by adding 135 μL to 100 μL of the diluted CdTe-CdS solution. A control solution of polyelectrolytes was also prepared by alternately adding 3 times 40 μL of PAH and 40 μL of PAA-Na to 100 μL of ddH2O with 5 minutes shaking on an orbital shaker between addition.

30 μL of the two control solutions and the CdTe-CdS with 1, 2, and 3 bilayers were each diluted separately with 165 μL of ddH2O. The Cadmium content of each solution prepared was determined using Measure iT Lead and Cadmium Assay kit (Invitrogen catalog number M36353). The results are shown in FIG. 9, where a clear change in measured Cd concentration is observed as bilayers of polyelectrolytes are added.

Additional Examples

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way.

While the present inventions have been described in conjunction with various embodiments and examples, it is not intended that the present inventions be limited to such embodiments or examples. On the contrary, the present inventions encompass various alternatives, modifications, and equivalents, as will be appreciated by those of skill in the art. Accordingly, the descriptions, methods and diagrams of should not be read as limited to the described order of elements unless stated to that effect.

The invention claimed is:

1. A nanoparticle composite comprising a nanoparticle surrounded within a layer of a plurality of collapsed polymeric polyelectrolyte stabilizing moieties, wherein the nanoparticle composite has a mean diameter in the range of between about 1 nm to about 100 nm.

2. The composite nanoparticle of claim 1 wherein one or more of the polyelectrolyte stabilizing moieties is crosslinked.

3. The composite nanoparticle of claim 2 wherein the cross-linking is accomplished by one of the following: electromagnetic radiation induced cross-linking, chemically induced cross-linking or thermally induced cross-linking.

4. The composite nanoparticle of claim 1 wherein the polymeric stabilizing moiety layer is porous to small chemical entities.

5. The composite nanoparticle of claim 4 wherein the small chemical entities have a mean size in the range of about 1 nm to about 5 nm.

6. The composite nanoparticle of claim 1 wherein the polymeric stabilizing moiety layer comprises one of the following: an ionizable polymer, an ionized polymer, a single polymer molecule, co-polymers thereof, and a combination of polymer compounds.

7. The composite nanoparticle of claim 1 wherein at least one of the polymeric stabilizing moieties comprises one of the following: poly (styrene sulfonate), poly(diallyldimethylammonium chloride), poly(acrylic acid), poly(ethyleneimine) and poly(allylamine hydrochloride).

8. The composite nanoparticle of claim 1 wherein at least one of the polymeric stabilizing moieties layer has a net charge.

9. The composite nanoparticle of claim 8 supported by a substrate forming a stabilized nanoparticle layer on the substrate.

10. The composite nanoparticle of claim 9 wherein the substrate surface has a net charge.

11. The composite nanoparticle of claim 9 wherein a second nanoparticle composite with an opposite charge polarity of the first nanoparticle composite is adsorbed to the stabilized nanoparticle layer.

12. The nanoparticle composite of claim 9 wherein the nanoparticle and substrate are sintered.

13. The nanoparticle composite of claim 1 wherein the nanoparticle composite is wholly encapsulated within a layer of a plurality of collapsed polymeric polyelectrolyte stabilizing moieties, wherein the nanoparticle composite has a mean diameter in the range of between about 1 nm and about 100 nm.

* * * * *